US010073849B2

(12) United States Patent
Xin

(10) Patent No.: US 10,073,849 B2
(45) Date of Patent: Sep. 11, 2018

(54) METHOD AND SYSTEM OF DYNAMICALLY GENERATING INTERIOR LOCATION MAP WITH INFORMATION

(71) Applicant: Alfred X. Xin, Cincinnati, OH (US)

(72) Inventor: Alfred X. Xin, Cincinnati, OH (US)

( * ) Notice: Subject to any disclaimer, the term of this patent is extended or adjusted under 35 U.S.C. 154(b) by 0 days.

(21) Appl. No.: 15/251,282

(22) Filed: Aug. 30, 2016

(65) Prior Publication Data

US 2018/0060332 A1    Mar. 1, 2018

(51) Int. Cl.
*H04W 24/00* (2009.01)
*G06F 17/30* (2006.01)
*G06F 3/14* (2006.01)
*H04W 4/04* (2009.01)
*G06F 3/147* (2006.01)
*G09G 5/14* (2006.01)
*G06F 3/0482* (2013.01)
*G06T 11/60* (2006.01)

(52) U.S. Cl.
CPC ...... *G06F 17/30061* (2013.01); *G06F 3/14* (2013.01); *G06F 3/147* (2013.01); *G06F 17/30241* (2013.01); *G09G 5/14* (2013.01); *H04W 4/04* (2013.01); *G06F 3/0482* (2013.01); *G06T 11/60* (2013.01)

(58) Field of Classification Search
CPC .................................. H04W 4/04; G06F 3/14
USPC .................................. 455/456.1, 457, 404.2
See application file for complete search history.

(56) References Cited

U.S. PATENT DOCUMENTS

2012/0173204 A1* 7/2012 Padmanabhan ........ G01C 15/00
703/1
2012/0274642 A1* 11/2012 Ofek ...................... G06T 17/05
345/441

\* cited by examiner

*Primary Examiner* — Chuck Huynh

(57) ABSTRACT

A system and method utilizes information collected and stored in a database, and dynamically and visually builds up an interior location map with information on occupants within the structure or building; the map is accessible upon request by internet and mobile device users.

19 Claims, 12 Drawing Sheets

(New)
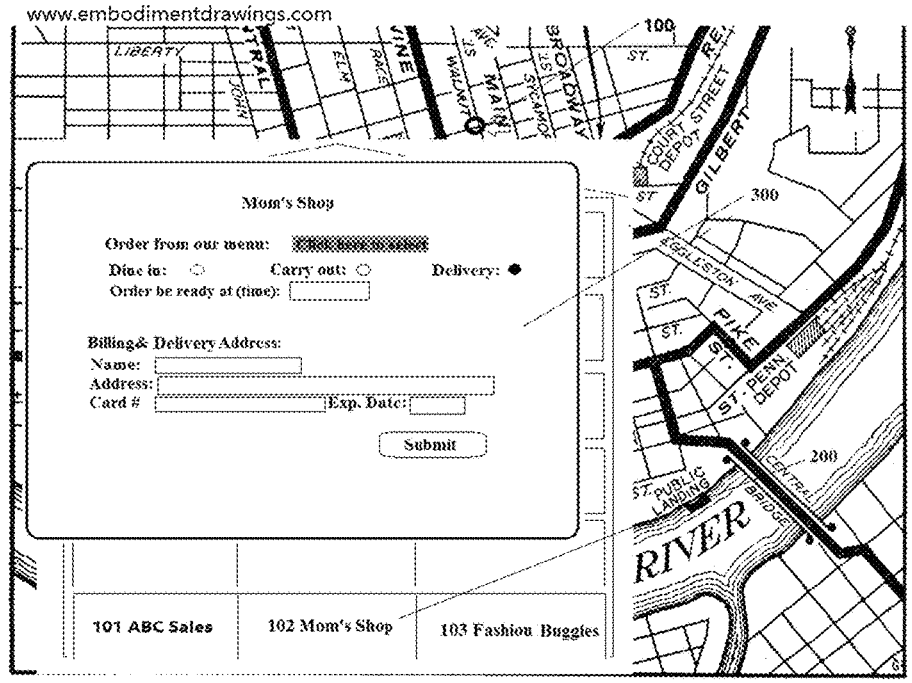
Fig. 3G
(New)

(New)

(New)

(New)

METHOD AND SYSTEM OF DYNAMICALLY GENERATING INTERIOR LOCATION MAP WITH INFORMATION

FIELD OF THE INVENTION

The present invention is related to dynamically generate interior locations map with information within structures and buildings.

Prior Arts Cited US Patents Documents

| | | |
|---|---|---|
| 8,817,049 | Apr. 29, 2011 | Nguyen, Hau |
| US20140375654 | Aug. 25, 2014 | |
| US20120274642 | Nov. 1, 2012 | |
| US20130243326 | May 3, 2013 | |
| US20120288202 | May 13, 2011 | |
| 8,891,816 | May 3, 2013 | Rush, Eric |
| US20150051994 | Aug. 11, 2014 | |
| US20120173204 | Jul. 5, 2012 | |

Prior Arts Cited Foreign Patents Documents

| | |
|---|---|
| EP20100174178 | Dec. 8, 2010 |
| EP1879116 | Aug. 30, 2001 |

BACKGROUND OF INVENTION

For internet and mobile users acquiring detailed information on specific locations within structures or buildings is valuable when they need knowledge such for various reasons. Currently digital maps and other location based display systems present information at the entire structure or building level, more detailed information within a structure or a building are only available if onsite device systems, such as iBeacon, Wifi and Blue tooth configured with a local or remote server, are installed on each interior location within a structure or a building.

Such approaches demand enormous financial costs, heavy skilled labor work, complex implementation procedures; further it is impossible to implement such systems to map out so many buildings in a city, not to say many countries in the world, especially for those developing regions and countries.

The present invention is to utilize information collected and submitted to a database by occupants of structures and buildings, authorized parties or data transferred from other databases via networks, and based on information available (either complete or incomplete) in the database, dynamically build up online maps with information of interior locations within structures and buildings, and with plurality of predetermined formats (e.g., graphic layouts, charts or matrix, digital maps, virtual images, photos and images of structures and buildings in plurality of views). And users are able to directly select and retrieve information related to specific interior location to retrieve more information; further users of mobile devices installed with mobile application of the system are able to receive interior locations' information when they are physically within a range or inside of a structure or building.

SUMMARY OF THE INVENTION

A System of dynamically generating interior location map with information consists of a software system, a database; internet and mobile application interfaces providing functions for occupants of structures and buildings or authorized parties or other data resources to enter or transfer interior location related information and related data, and upload said information and data to said database; when users submit requests for getting interior structural positions related information, said software system retrieves said information and sends said information to said internet and mobile application interfaces and display interior locations in a structure or a building on a digital map, charts or matrix layouts, pictures, photos and etc.

Said internet and mobile application interfaces are configured to allow said occupants of structures, buildings, authorized parties or other data resources to submit or transfer said occupants' location information within said structures or buildings, and store said information to said database via said web and mobile interfaces and said software system. When users via interfaces of web or mobile application submit requests for acquiring interior location maps, said software system is configured to calculate information available related to occupants and sub locations of a structure or a building stored in said database. Based on information available in said database, said software provides a variety of methods to dynamically generate the map, including utilizing background images and photos available in said database for said structure or building, formatting the map on charts or matrix layouts, graphic images for said structure or building; and displays said interior location map on said interfaces of said web or mobile applications.

If information on interior structure is completely available in the database for a structure or a building, said software processing logics is configured to create and display occupants' locations on said interfaces with charts or layouts in matrix formats, graphic images or photos based on said interior structure accordingly. If information on interior structure is not available and information on occupants are incomplete in the database with said structure and building, said software processing logics is configured to dynamically calculate and generate map, charts, layouts in matrix formats, graphic images or photos based on information available at the time.

When user of mobile device installed with a geo tracking system and said mobile application is physically within a range or inside a structure or a building, said online software system forwards and displays an interior location map on an interface of said mobile application.

PREFFERED EMBODIMENT

Figure 1A:
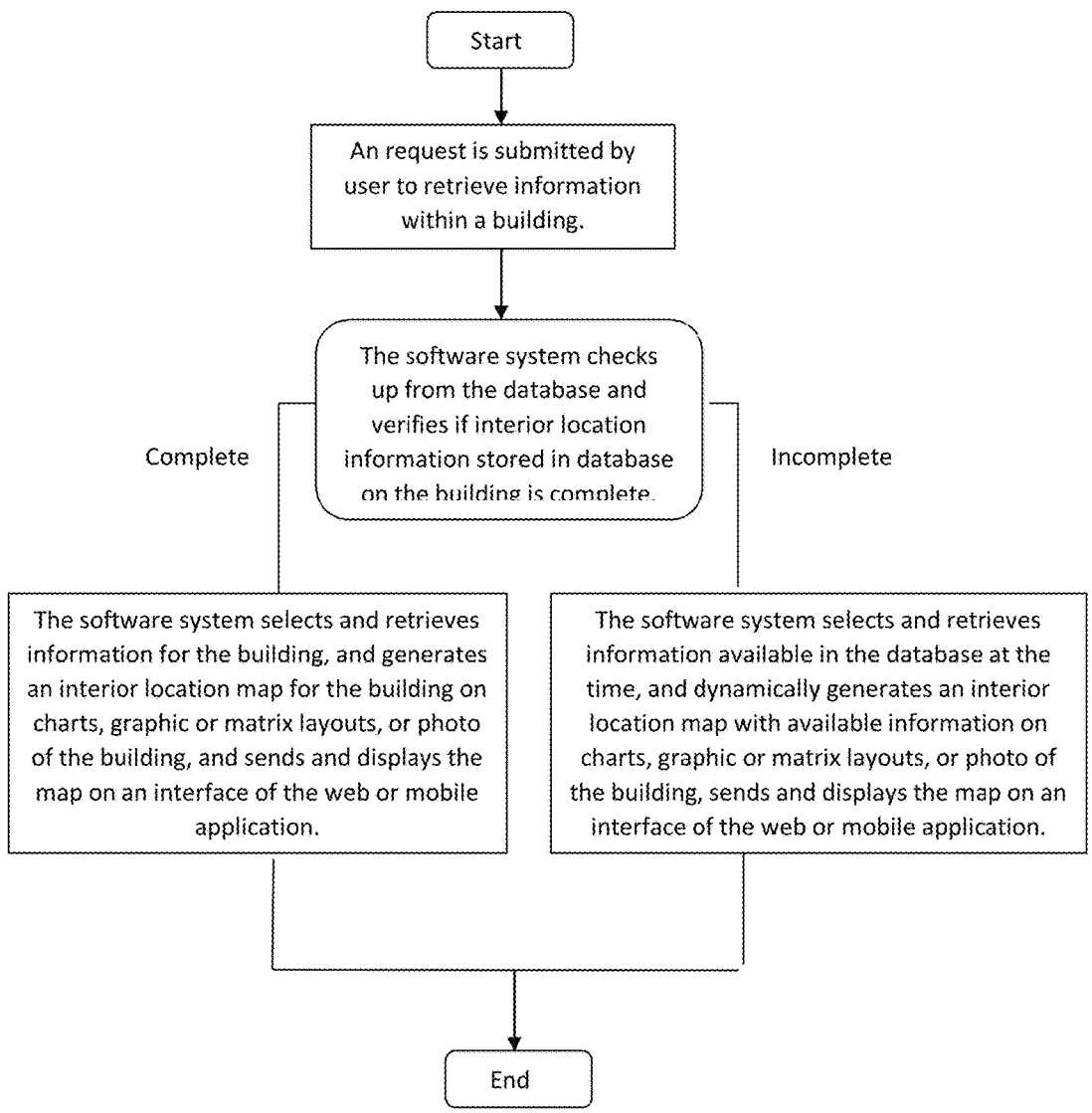
FIG. 1A is a flow-chart that demonstrates logical flows of said system of dynamically generating interior location map with information.
Figure 2A:
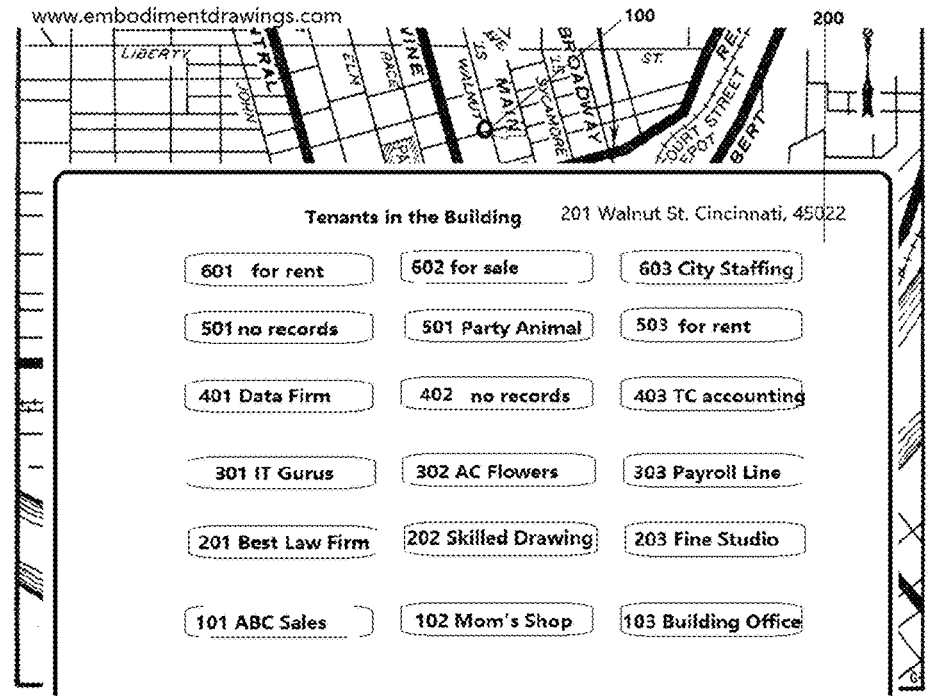
FIG. 2A shown an interior location map is generated and displayed on a two dimensional table on a web page based on complete data for a building stored in said database.

Refer to drawings FIG. 1A and FIG. 2A of a preferred embodiment of said system of dynamically generating interior location map with information. An online user searched geo location on a digital map and needed to get information on a building, said user selected said building location on said map (FIG. 2A—100); Said system of dynamically generating interior location map with information searched its database and found information on interior structure of said building and occupancies of said building were stored in said database.

Figure 2B:
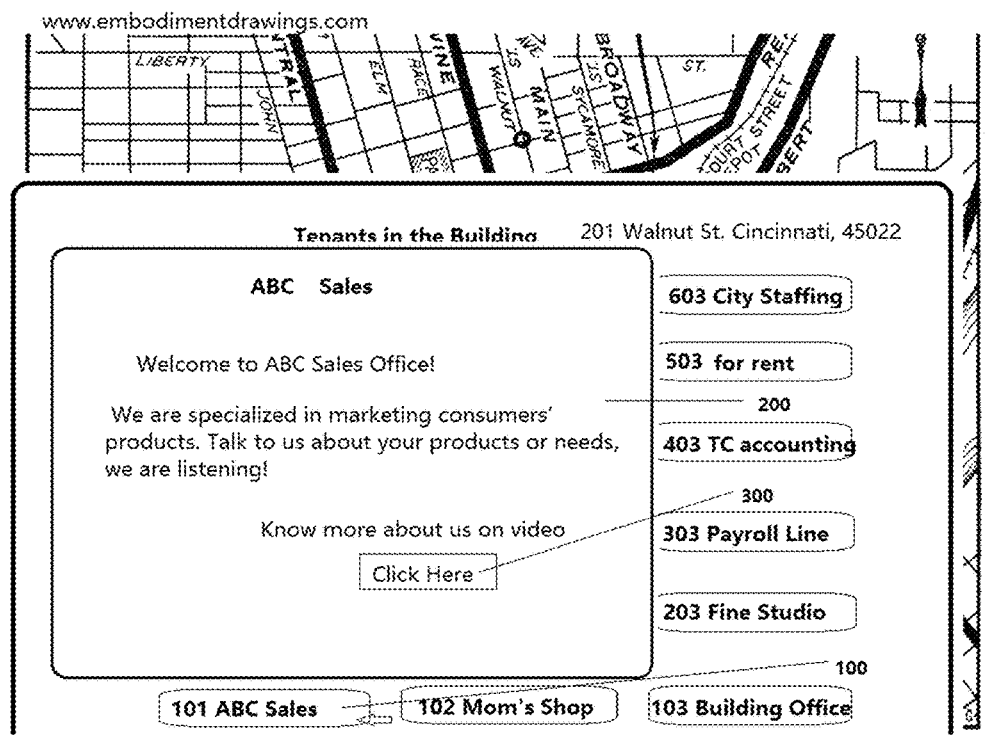
FIG. 2B shown a web page popped up when a user selected an interior location to retrieve more information.

Said software system selected and retrieved said information and generated a two dimensional table (FIG. 2A—200); put it on a web page, pushed back and displayed said web page on said online user's internet browser. Said user selected an interior location within said building (FIG. 2B—100), another web page popped up and showed detailed information about the occupant (FIG. 2B—200), said web page also displayed links for more information in different format (FIG. 2B—300).

Figure 2C:
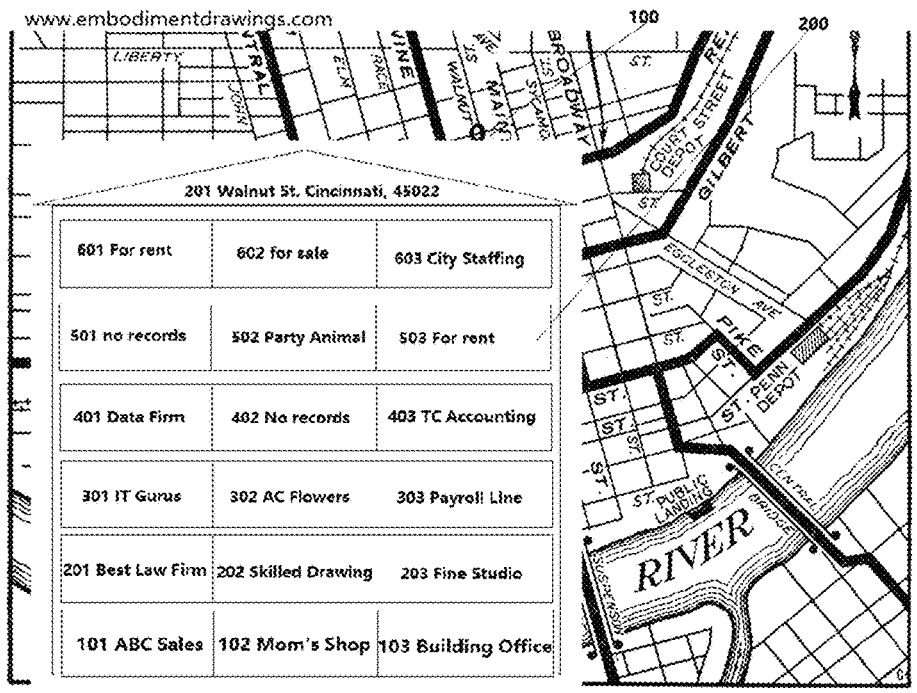
FIG. 2C shown an interior location map is generated and displayed on a building-like graphic image on web page based on complete data for a building stored in said database.

Refer to drawings FIG. 1A and FIG. 2C of another preferred embodiment of said system of dynamically generating interior location map with information. An online user searched geo location on a digital map and needed to get information on a building, said user selected said building location on said map (FIG. 2C—100); Said system searched its database and found information on interior structure of said building and occupancies of said building were stored in said database.

Figure 2D:
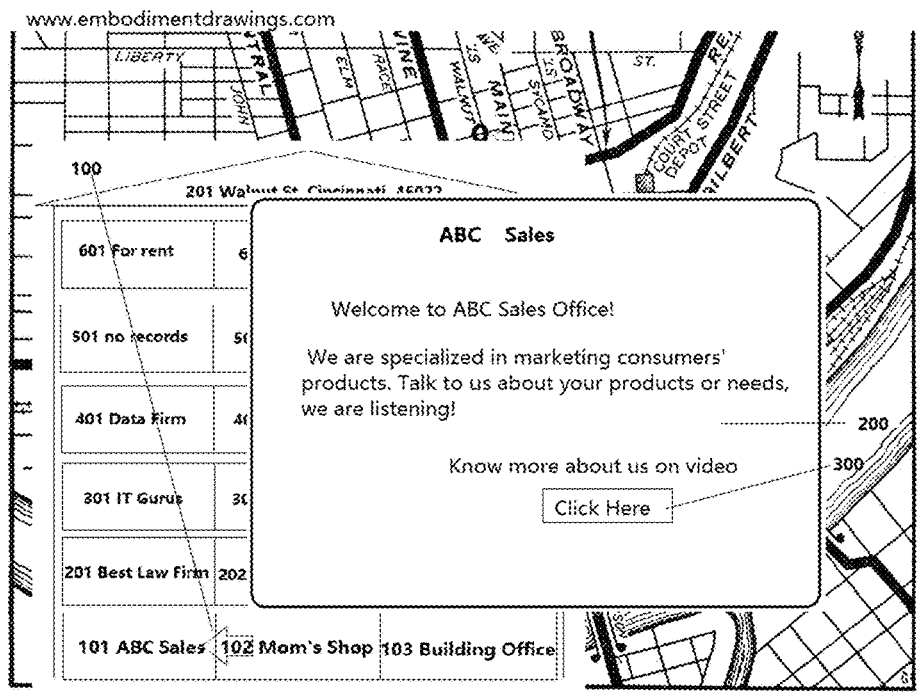
FIG. 2D shown a web page popped up when a user selected an interior location to retrieve more information.

Said software system selected and retrieved said information and generated said information on a two dimensional table presented on a building-like graphic image (FIG. 2C—200); put it on a web page, pushed back and displayed said web page on said online user's internet browser. Said user selected an interior location within said building (FIG. 2D—100), another web page popped up and showed detailed information about the occupant (FIG. 2D—200), said web page also displayed links for more information in different format (FIG. 2D—300).

Figure 2E:
FIG. 2E shown an interior location map is generated and displayed on street view photo on web page based on complete data for a building stored in said database.

Refer to drawings FIG. 1A and FIG. 2E of still another preferred embodiment of said system of dynamically generating interior location map with information. An online user searched geo location on a street view photo map and needed to get information on a building, said user selected said building location on said street view photo map (FIG. 2E—100); Said system searched its database and found information on interior structure of said building and occupancies of said building were stored in said database.

Figure 2F:
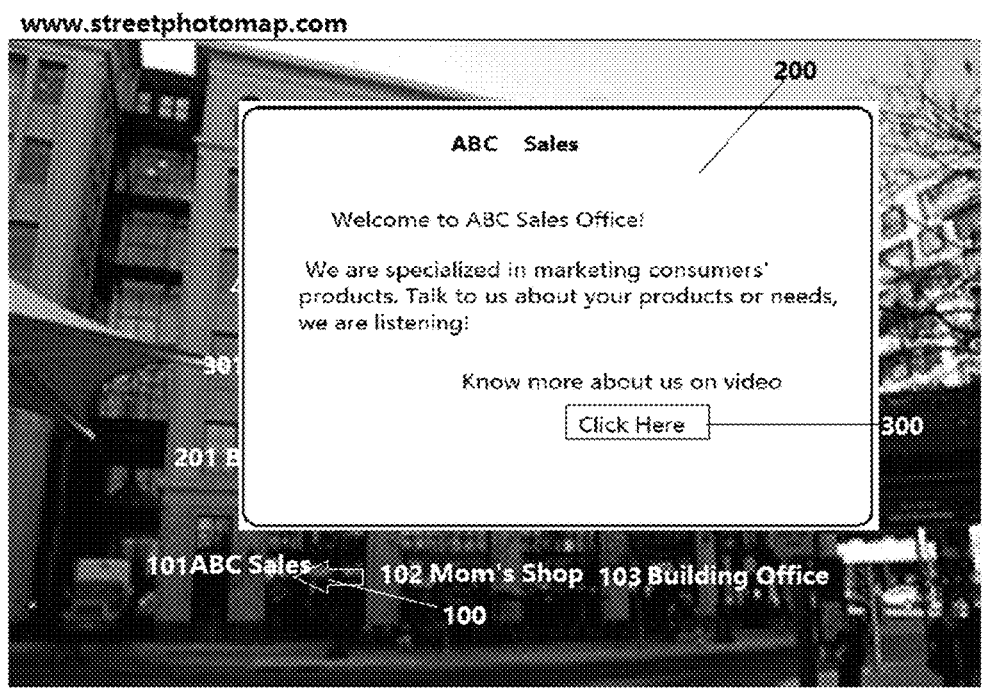
FIG. 2F shown a web page popped up when a user select an interior location on said street view photo to retrieve more information.

Said software system selected and retrieved said information and added sub location information for each unit inside said building on photo of said building accordingly (FIG. 2E—200); pushed back and displayed said photo on web page on said online user's internet browser. Said user selected an interior location within said building on said photo (FIG. 2F—100), another web page popped up and showed detailed information about the occupant (FIG. 2F—200), said web page also displayed links for more information in different format (FIG. 2F—300).

Figure 3A:
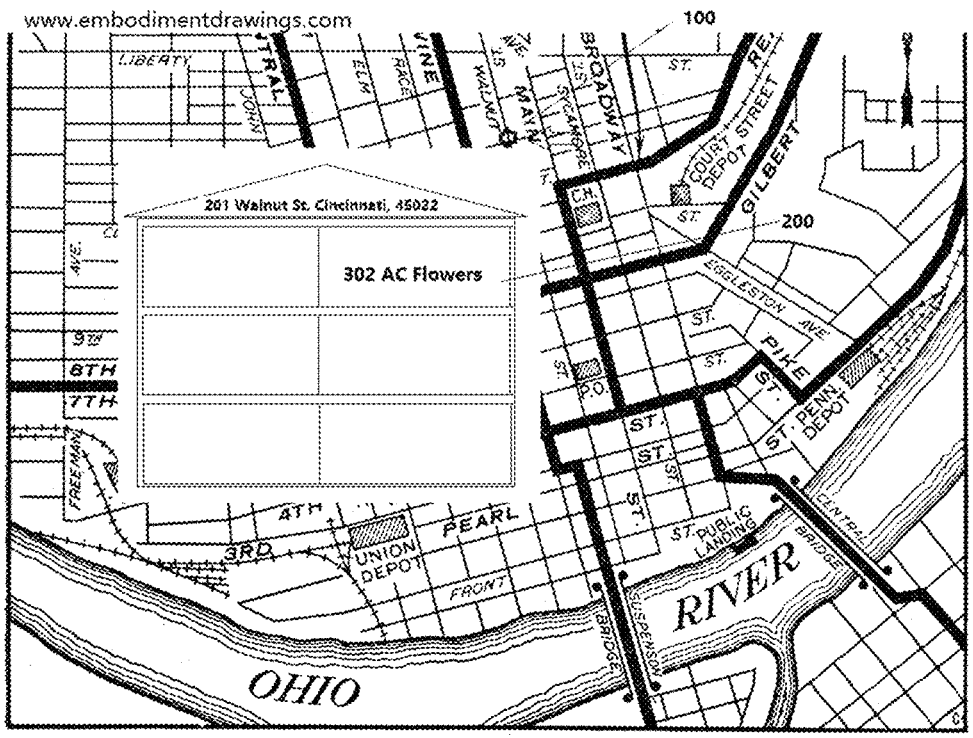
FIG. 3A shown an interior location map is dynamically generated and displayed on a graphic image based on incomplete data for said building stored in said database.

Refer to drawings FIG. 1A and FIG. 3A of still another preferred embodiment of said system of dynamically generating interior location map with information. An online user searched geo location on a digital map and needed to get information on a building, said user selected said building location on said map (FIG. 3A—100); Said system searched its database and found that information on interior structure of said building and occupancies of said building were NOT completely stored in said database.

Said software system retrieved information available for said building available in said database. Since at the time of request there was only one occupant of said building claimed its sub location in said building, and said database had no information on structure of said building, said software activated a logic processor to dynamically generate a building-like graphic image with available data from database on the interior location: Unit number 302 (FIG. 3A—200) was the only interior location available in said database, and it also indicated that said unit was the second unit on third floor of said building. Since there were no bigger numbers on stories and units of said building available in said database, said logic processor of said software system dynamically generated a three-story building-like image with two units on each floor.

Figure 3B:
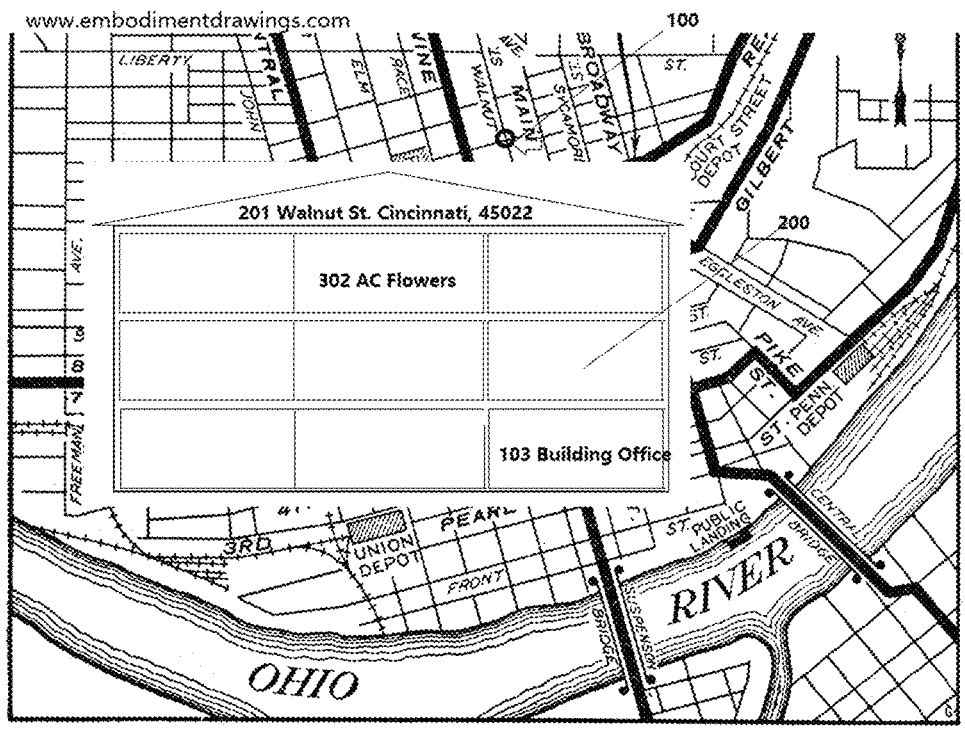
FIG. 3B shown an interior location map is dynamically generated and displayed on a graphic image based on incomplete, but with more data added on for said building and stored in said database.

Days later another tenants in said building submitted their location information to said database via web interfaces of said system. When another online user searched geo location on a digital map and needed to get information on said building, said user selected said building location on said map (FIG. 3B—100); Said system searched its database, and found that information on interior structure of said building and occupancies of said building were NOT completely stored in said database.

Said system retrieved information available for said building available in its database. Since that the time of request there were two occupants of said building claimed their locations in said building, and said database had no information on structure of said building, said software system activated said logic processor to dynamically generate a building-like graphic image with available data from said database on interior locations: Unit number 103 and 302 (FIG. 3B—200) were interior locations available in said database, and it also found that unit 103 was the third unit on first floor of said building. Since there were no bigger numbers on stories and units of said building available in said database, said logic processor of said software system generated a three-story building-like image with three units on each floor.

Figure 3C:
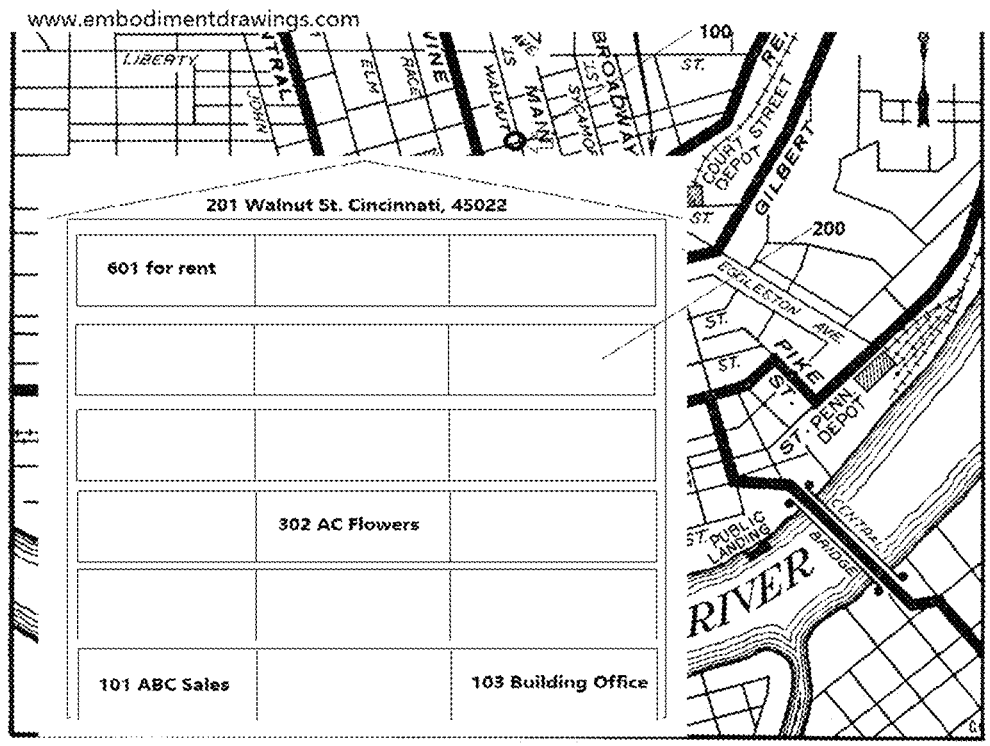
FIG. 3C shown an interior location map is dynamically generated and displayed on a graphic image based on incomplete, but with still more data added on for said building and stored in said database.
Figure 3D:
FIG. 3D shown an interior location within a building is selected by a user on web interface and a window popped up with more information and with links to more detailed information in multimedia format.

Still another day later another tenants in said building submitted their interior location information to said database via web interfaces of said. When still another online user searched geo location on a digital map and needed to get information on said building, said user selected said building location on said map (FIG. 3C—100); Said system searched its database and found that information on interior structure of said building and occupancies of said building were NOT completely stored in said database.

Said software system retrieved information available for said building available in said database. Since at the time of request there were three occupants of said building claimed their locations in said building, and said database still had no information on structure of said building, said software activated said logic processor to dynamically generate a building-like graphic image with available data from database on interior locations: Unit number 103, 302 and 601 (FIG. 3C—200) were locations available in said database, and it also identified that newly registered unit was on fifth floor of said building. Since there were no bigger numbers on stories and units of said building available in said database, said logic processor of said software system dynamically generated a five-story building-like image with three units on each floor.

Such process shall continue with or without completion of information on interior structure of a building stored in said database.

Figure 3E:
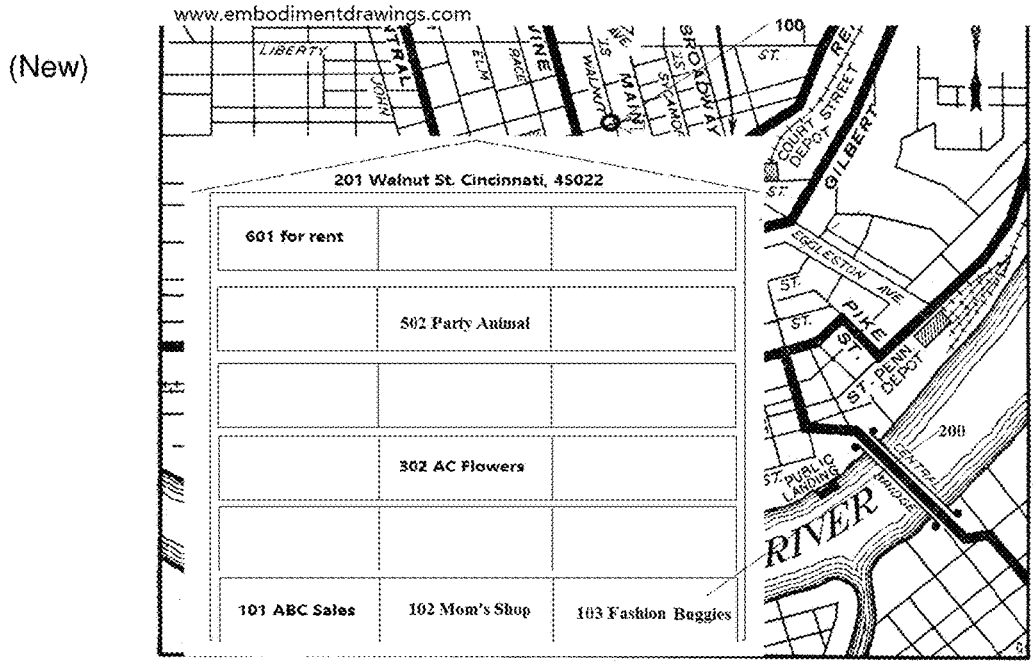
FIG. 3E shown an interior location within a building is newly leased to a tenant.
Figure 3F:
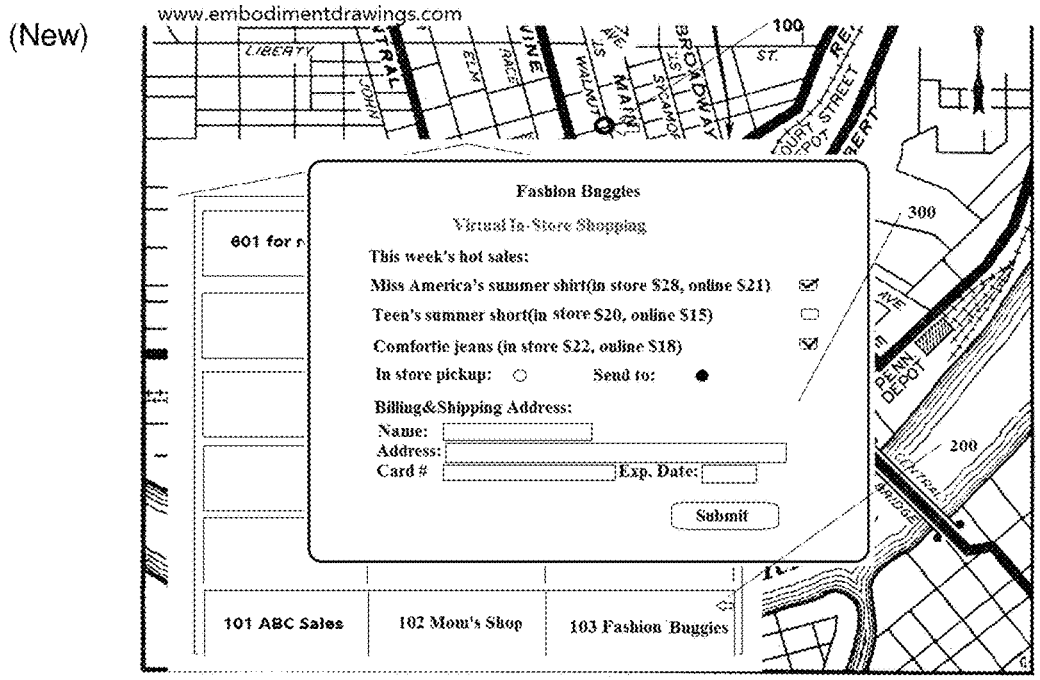
FIG. 3F shown an online user shops at a business of an interior location in a building, FIG. 3G shown another sample of online user shops at a business of an interior location in a building.
Figure 3H:
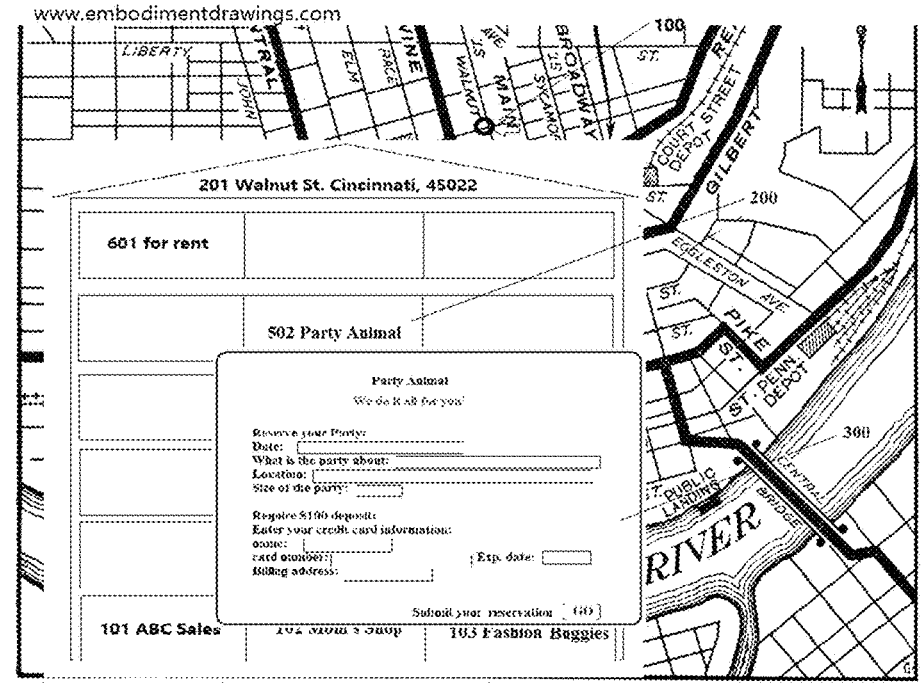
FIG. 3H shown still another sample of online user shops at a business of an interior location in a building.

Later database of said system was updated, and Unit 103 of said building (FIG. 3E—100) was leased to a new tenant (FIG. 3E—200).

After while some of interior location owners activated online shopping and service functions provided by said system. When online users searched geo location on a digital map and needed to get information on said building, said online users selected said building locations on said map (FIG. 3F—100, FIG. 3G—100, FIG. 3H—100), and selected businesses located within said building (FIG. 3F—200, FIG. 3G—200, FIG. 3H—200); Said system provided said businesses with online shopping and service functions, said businesses were able to allow said online users to place shopping orders and service requests (FIG. 3F—300, FIG. 3G—300, FIG. 3H—300) offered by businesses operated within said building.

Figure 4A:
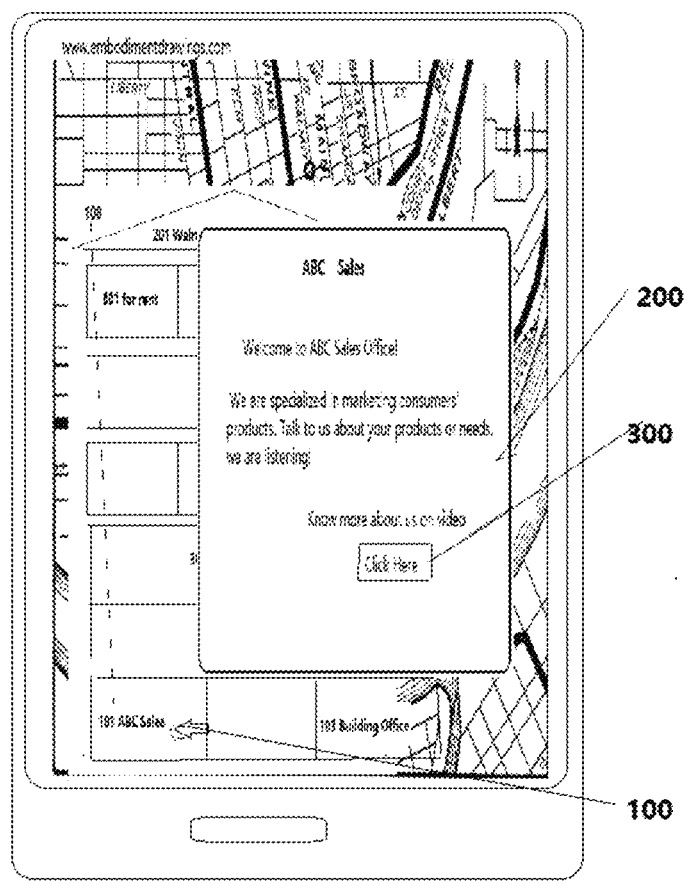
FIG. 4A shown a user with mobile device installed with said mobile application is physically onsite of a building, and an interior location map with information is generated and shown automatically on said mobile application.

Refer to drawings FIG. 1A and FIG. 4A of still another preferred embodiment of said system of dynamically generating interior location map with information. A mobile device user with a mobile device installed with mobile application of said system of dynamically generating interior location map with information walked to an entrance of a commercial building.

As he nearly entered said building, said mobile application played a cheerful ring tone followed by recorded voice announcing information for the building is available to review, and in the meantime said mobile application fired up a window with interior structure of said building. Said user was going to visit a business in the building and needed to know more information, He selected the business located on building-like graphic image (FIG. 4A—100), another window popped up and displayed more information about said business (FIG. 4A—200), also information on video clip about said business is available on said window (FIG. 4A—300). Now said user knew where the company was and what products said company was marketing.

Figure 5A:
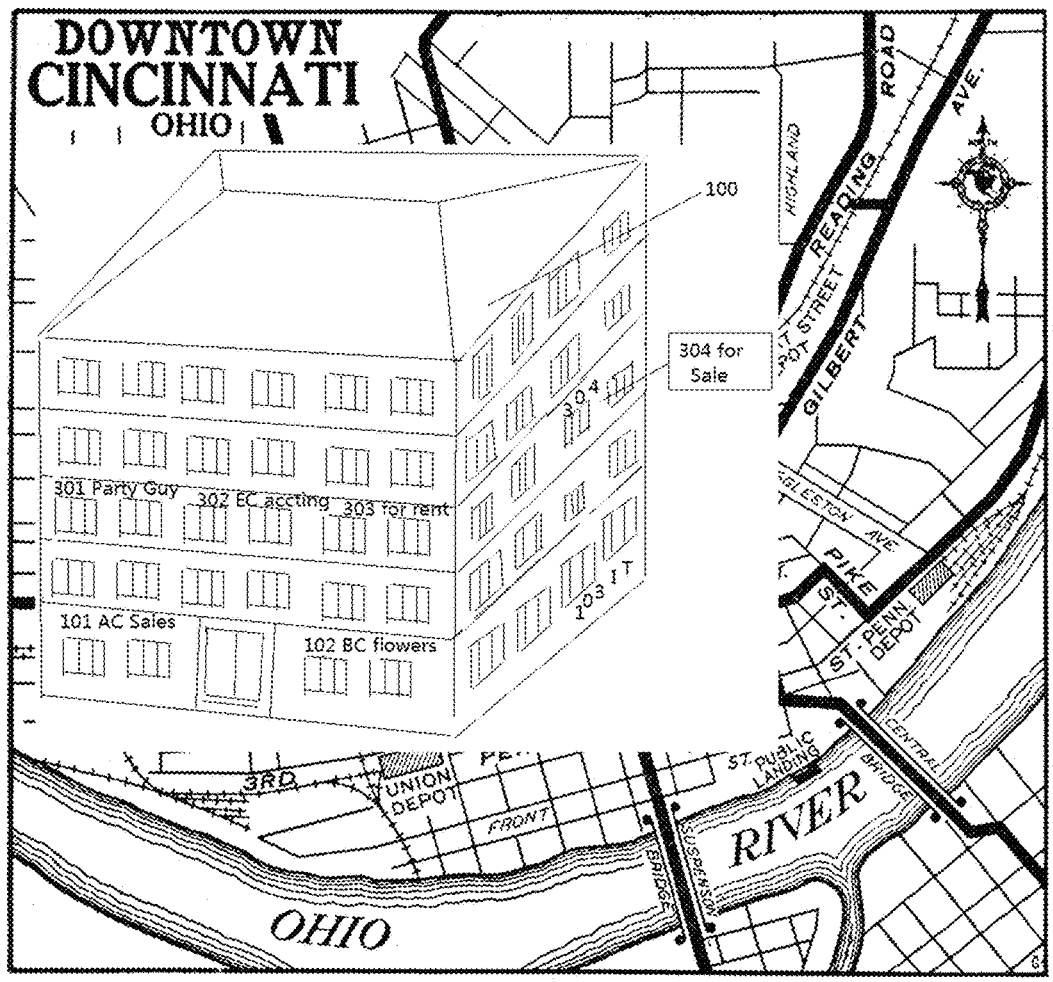
FIG. 5A shown a building in 3 dimensional image.
Figure 5B:
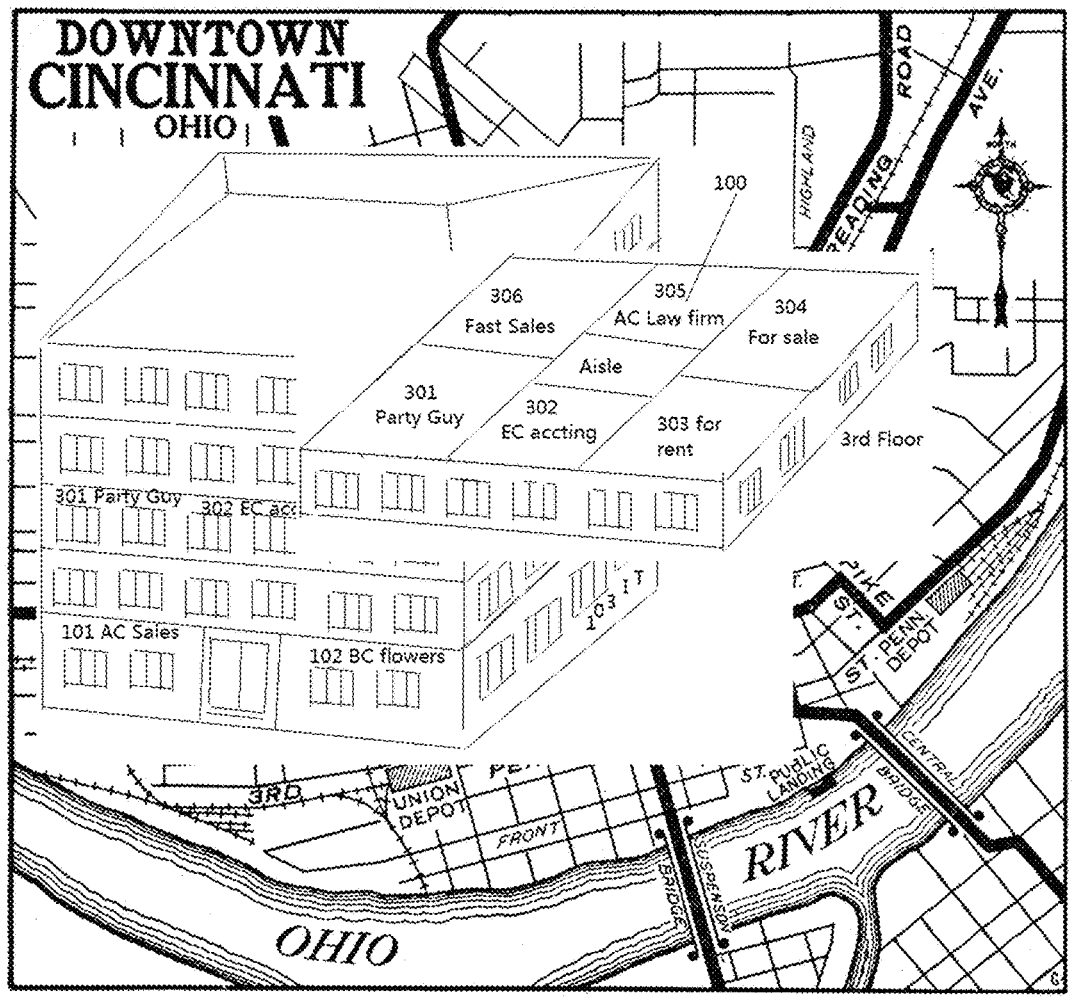
FIG. 5B shown a single story of a building selected from a 3 dimensional image of a building.

Refer to drawings FIG. 1A and FIG. 5A and FIG. 5B of still another preferred embodiment of said system of dynamically generating interior location map with information. A three dimensional building image (FIG. 5A—100) was shown on a digital map when an online user selected a building on said digital map. Said online user then selected a story in said building, and an image of floor layout of said story with information for each unit (FIG. 5B—100) is shown on said digital map.

Figure 6A:
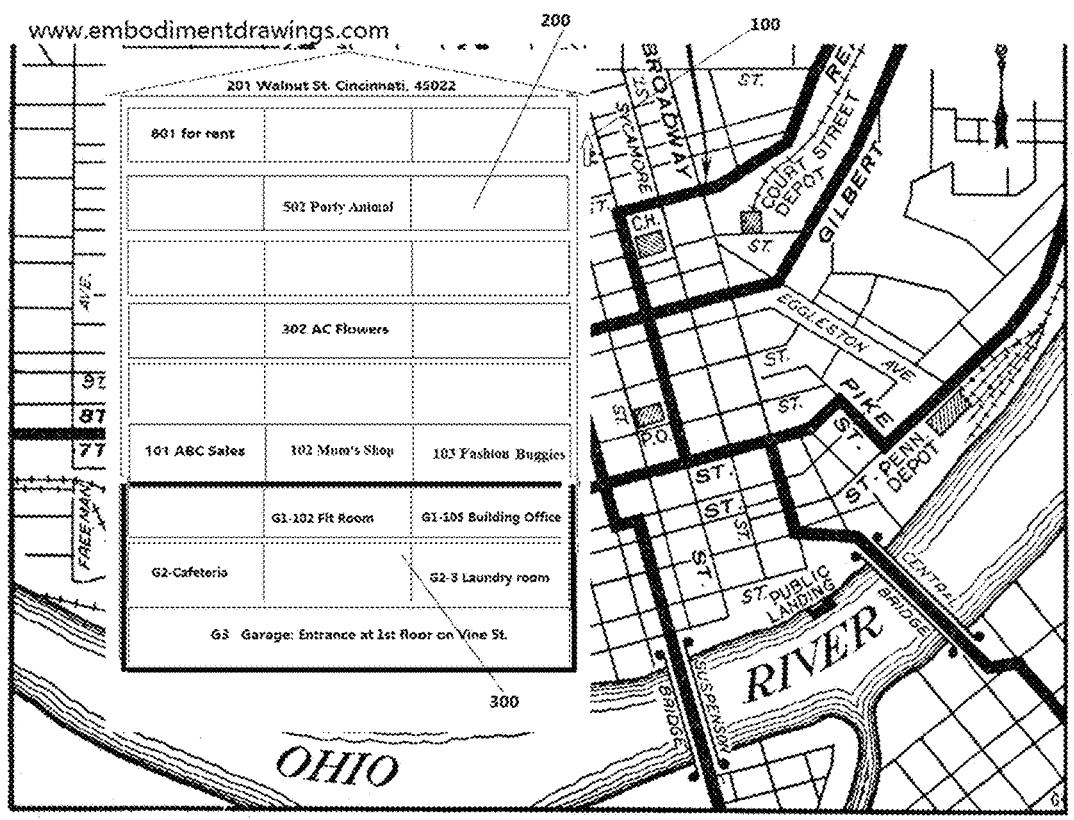
FIG. 6A shown an interior location map of a building with underground structures.

Refer to drawings FIG. 1A and FIG. 6A of still another preferred embodiment of said system of dynamically generating interior location map with information. When an online user selected a building location on a digital map of web page (FIG. 6A—100), said building structure (FIG. 6A—200), including underground structure of said building (FIG. 6A—300), was shown on said digital map.

The embodiments are mainly illustrations of the invention, advantages of the invention may be learned by practice, realized and attained by means of the elements and combinations particularly pointed out in claims. Further it is to be understood that both the foregoing general descriptions and detailed descriptions are exemplary and explanatory only and are not limited to the invention as claimed.

The invention claimed is:

1. A system for generating a table or a map of a structure wherein the table or the map includes occupant data for the structure comprising the steps of:
   providing a server database, said server database being communicably coupled to a communications network, said server database having a software application configured to provide operation of the system;
   downloading the software application, wherein a plurality of users download the software application to a local computing device;
   submitting a first set of building occupant data, wherein a user of the system submits data providing details of building occupants, said first set of building occupant data being submitted to the server database and wherein the first set of building occupant data is submitted from a plurality of online sources communicably coupled to said server database;
   receiving the first set of building occupant data;
   storing the first set of building occupant data;
   associating the first set of building occupant data with a geolocation for a building;
   searching for a structure on a computer based map, wherein a user of the system searches for a structure on a computer based map;
   identifying a building;
   generating a table or an interior map of the identified building, wherein the table or the map contains information on building occupants.

2. The system for generating a table or a map of a structure as recited in claim 1, wherein the table or the interior map is provided in a plurality of formats.

3. The system for generating a table or a map of a structure as recited in claim 2, and further including the step of referencing the server database to determine if the identified building has complete or incomplete building occupant data set.

4. The system for generating a table or a map of a structure as recited in claim 3, and further including the step of dynamically generating a table or an interior map for the identified building when the building occupant data set is incomplete.

5. The system for generating a table or a map of a structure as recited in claim 1, and further including the step of receiving a request for a structure that is not stored within the server database.

6. The system for generating a table or a map of a structure as recited in claim 5, and further including step of generating a table or a map for an unknown building wherein the table or the map for the unknown building is dynamically generated through alphanumerical logic processing.

7. The system for generating a table or a map of a structure as recited in claim 4, and further including the step of identifying and monitoring the location of a user of the system.

8. The system for generating a table or a map of a structure as recited in claim 7, and further including the step of generating a table or an interior map of a structure for a user when the user has been identified as being in a location for which the system has building occupant data.

9. A system operable to dynamically generate a table or an interior map for a building wherein the table or the interior map includes building occupant data comprising the steps of:
providing a server database, said server database being communicably coupled to a communications network, said server database having a software application configured to provide operation of the system;
downloading the software application, wherein a plurality of users download the software application to a local computing device;
collecting a plurality of building occupant data, said building occupant data being collected by said server database, said building occupant data being submitted to said server database via a website, a computer or a mobile device having a software application for the system, said building occupant data being collected for a plurality of buildings, said building occupant data being linked with specific a buildings wherein each building has geolocation data;
storing the plurality of building occupant data;
searching for a building on a computer based map, wherein a user of the system searches for a building on a computer based map;
receiving a request for interior information of a building;
determining if the building occupant data for the request building is complete or incomplete;
generating a table or an interior map of the identified building, wherein the table or the interior map contains information on building occupants retrieved from the collected building occupant data.

10. The system operable to dynamically generate a table or an interior map for a building as recited in claim 9, and further including the step of utilizing alphanumerical logic processing to generate a table or an interior map upon the server database having an incomplete building occupant data set.

11. The system operable to dynamically generate a table or an interior map for a building as recited in claim 10, wherein the table or the interior map is generated utilizing a two dimensional or a three dimensional matrix.

12. The system operable to dynamically generate a table or an interior map for a building as recited in claim 11, wherein the alphanumerical logic processing for dynamically generating a table or an interior map requires a data input of at least three sets of alphanumerical characters.

13. The system operable to dynamically generate a table or an interior map for a building as recited in claim 9, and further including the step of receiving updates on building occupant data, said updates being stored on said server database for the associated building.

14. The system operable to dynamically generate a table or an interior map for a building as recited in claim 13, and further including the step of tracking a location of the users of the system, wherein the software application of the system provides geolocation tracking of the users.

15. The system operable to dynamically generate a table or an interior map for a building as recited in claim 14, and further including the step of identifying a location of a user, wherein the system identifies that the user has a geolocation wherein the geolocation matches a stored geolocation for a building stored in the system.

16. The system operable to dynamically generate a table or an interior map for a building as recited in claim 15, and further including the step of transmitting an interior map to a user that is located in a building for which the system has building occupant data, wherein the transmission of the interior map is executed subsequent geolocation identification of the user.

17. The system operable to dynamically generate a table or an interior map for a building as recited in claim 16, wherein the table or the interior map is displayed to a user in a plurality of formats.

18. The system operable to dynamically generate a table or an interior map for a building as recited in claim 9, and further including the step of providing with a marketing function.

19. The system operable to dynamically generate a table or an interior map for a building as recited in claim 9 and further including the step of providing information of occupants in a building or a structure in a plurality of data formats.

* * * * *